United States Patent [19]

North

[11] Patent Number: 4,747,948

[45] Date of Patent: May 31, 1988

[54] PARALLEL PLATE EXTRACTOR SYSTEM AND METHOD FOR USING SAME

[76] Inventor: Darryl L. North, 10 Shafto St., Farmingdale, N.J. 07727

[21] Appl. No.: 942,671

[22] Filed: Dec. 17, 1986

Related U.S. Application Data

[63] Continuation-in-part of Ser. No. 714,122, Mar. 20, 1985, abandoned.

[51] Int. Cl.$^4$ .................. B01D 11/00; B01D 21/02
[52] U.S. Cl. .................. 210/633; 210/634; 210/802; 210/201; 210/219; 210/511; 210/521; 210/532.1; 422/259; 422/269
[58] Field of Search .............. 210/633, 634, 802, 200, 210/201, 202, 219, 521, 523, 532.1, 534, 535, 536, DIG. 5, 296, 319, 511; 422/259, 269, 275; 209/210; 196/14.52

[56] References Cited

U.S. PATENT DOCUMENTS

| | | | |
|---|---|---|---|
| 863,168 | 8/1907 | Griswold, Jr. | 210/201 |
| 2,845,936 | 8/1958 | Boynton et al. | 422/269 |
| 3,089,756 | 5/1963 | Tanner | 422/259 |
| 3,097,071 | 7/1963 | Lowes et al. | 422/259 |
| 3,615,025 | 10/1971 | Rice et al. | 210/208 |
| 3,898,164 | 8/1975 | Hsiung | 210/521 |
| 4,132,651 | 1/1979 | de Jong | 210/522 |
| 4,292,277 | 9/1981 | Bonney et al. | 422/259 |
| 4,400,280 | 8/1983 | Larsson et al. | 210/802 |

FOREIGN PATENT DOCUMENTS

| | | | |
|---|---|---|---|
| 885503 | 12/1961 | United Kingdom | 422/259 |
| 2103505 | 2/1983 | United Kingdom | 210/532.1 |
| 891109 | 12/1981 | U.S.S.R. | 422/269 |

*Primary Examiner*—Richard V. Fisher
*Assistant Examiner*—Linda S. Evans
*Attorney, Agent, or Firm*—Frank J. Uxa

[57] ABSTRACT

An improved extraction apparatus comprises (a) an elongated trough-like vessel; (b) first and second inlets for introducing relatively heavy and light materials, respectively, into the vessel; (c) first and second outlets for removing relatively light and heavy materials, respectively, from the vessel; (d) a plurality of horizontally spaced parallel plate assemblies located in the vessel to provide for material separation based on material density and to provide the relatively light and heavy materials to be removed from the vessel; and (e) a plurality of agitation devices, at least one device being located in each space between the parallel plate assemblies to facilitate contact between the materials present in the space.

Improved methods for extraction are also disclosed.

17 Claims, 2 Drawing Sheets

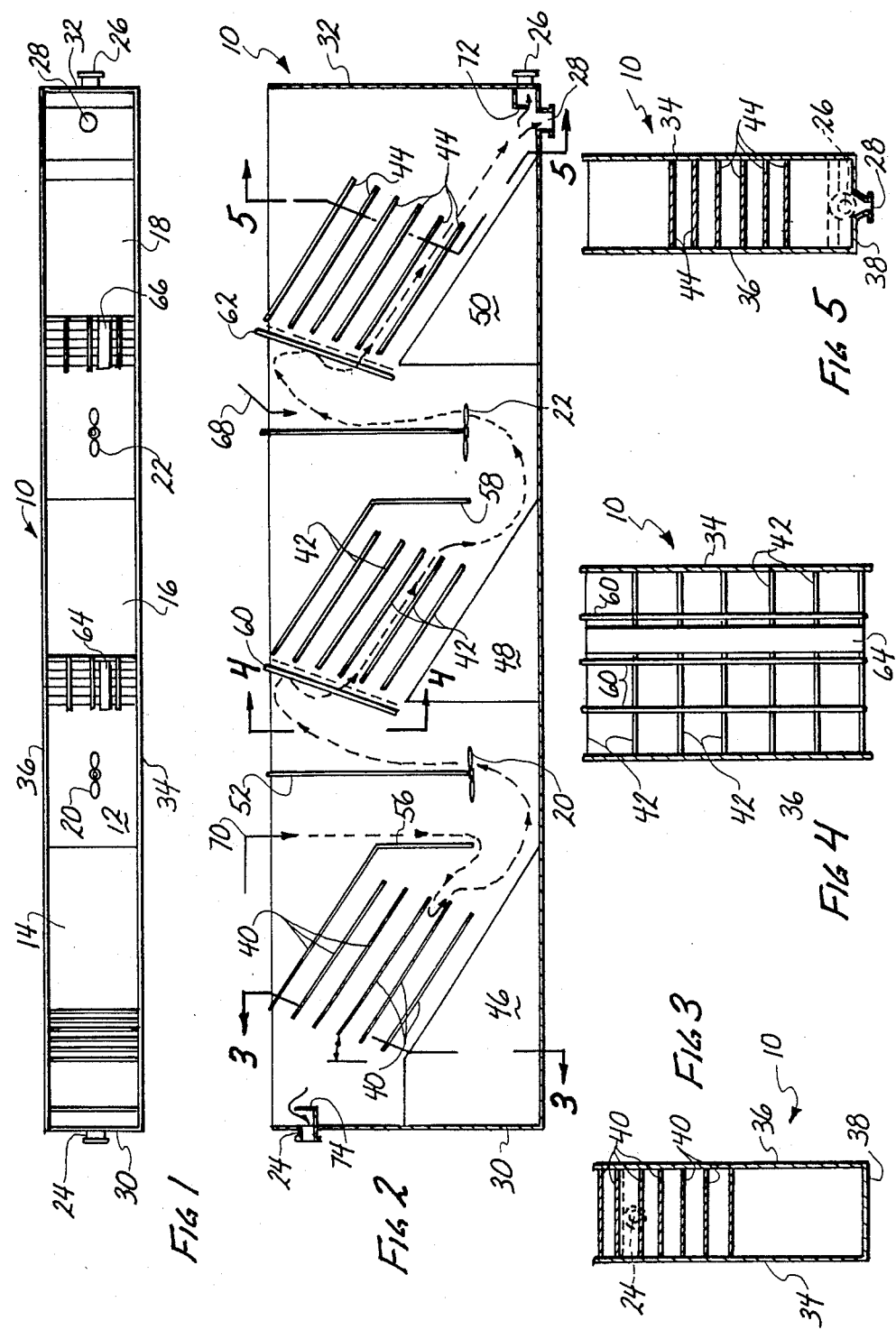

PARALLEL PLATE EXTRACTOR SYSTEM AND METHOD FOR USING SAME

RELATED APPLICATION

This application is a continuation-in-part of copending application Ser. No. 714,122, filed Mar. 20, 1985 now abandoned.

BACKGROUND AND SUMMARY OF THE INVENTION

The present invention relates to extraction between materials of differing densities. More particularly, this invention relates to liquid-liquid or liquid-solid extraction between materials of differing densities in which parallel plate assemblies are advantageously used.

The use of inclined parallel plates to create restricted flow channels for the purposes of expediting phase separation (e.g., oil or sand from water) by density differences is today a well-known practice. The narrow flow channels both discourage turbulence and minimize settling distances, thereby speeding the separation process.

One of the earlier processes (U.S. Pat. No. 2,755,302) disclosed the co-current (one feed) separation of heavy, insoluble nitroglycerine compounds from wash waters.

The value of co-current parallel plate separators was widely recognized when world concern for both cleaner waste waters and conserving crude and waste oils called attention to the need for simple phase separating devices. Thus, devices using assemblies of parallel plates for separating or clarifying single feed streams abound, often with an evolution of specialization offering better efficiency at specific functions. For example, U.S. Pat. No. 3,795,091 discloses a method of assembling plates in modular units for use in separators. U.S. Pat. No. 3,903,000 details a device to utilize parallel plates to settle impurities from a water feed-stream. U.S. Pat. No. 3,933,654 discloses a device to use parallel plates to separate and recover oil from a liquid feed stream. U.S. Pat. No. 4,089,782 describes a method to distribute the feed stream to the parallel plate assembly, and modifies the plate ends to better catch and separate oil from the feed stream.

In addition, U.S. Pat. No. 4,120,796 discloses a device with a settling chamber prior to the plate assembly. The ends of the plates in the assembly are modified to offer better separation and less re-entrainment into the clarified flow. U.S. Pat. No. 4,120,797 describes a system which involves settling at 90° to the feed flow direction by tilting the plates in a different direction. U.S. Pat. No. 4,132,651 discloses a weir to create better feed distribution to the parallel plates. U.S. Pat. No. 4,120,791 and U.S. Pat. No. 4,290,898 describe the use of parallel plate assemblies as auxiliary devices to settle the heavy portion of the feed into traditional pond clarifiers.

In all of the above-noted cases, the system disclosed is used in a co-current flow scheme for dividing into its components a single feed stream directed into the parallel plate assembly. It would be advantageous to provide a system and method for counter-current extraction using parallel plate assemblies.

U.S. Pat. Nos. 4,268,484 and 4,292,277 disclose the use of a plurality of pairs of vertically aligned parallel plates in a multistage co/counter current extractor wherein each pair of plate assemblies involves a plate assembly positioned above an agitated volume and a plate assembly positioned below the agitator volume. The agitated dispersion enters the non-turbulent flow channels between the plates (lighter dispersion rising into the top plate assembly, while heavier dispersion settles to the bottom assembly) where separation occurs. Light phase, disengaged of heavier material, rises through the top assembly to a collection chamber from which it overflows and is ducted into the next agitated volume, while the heavier material settles back into the original agitated volume. Heavy phase settles through the bottom assembly, disengaging itself of light material which rises back into the agitation area, and enters a collecting chamber from which it overflows a weir or is ducted to the next agitation stage in a direction co or counter-current to the lighter phase flow.

In both U.S. Pat. Nos. 4,268,484 and 4,292,277 each pair of parallel plate assemblies is utilized in the traditional separator-clarifier-settler mode with mixed feed entering the flow passages between the parallel plates in one direction (from the agitation chamber) to have phase separation occur with the subsequent passage of a more-or-less purified "disengaged" phase. It would be advantageous to provide an extraction system and method using parallel plate assemblies which utilize a reduced number of plate assemblies for a given degree of extraction, and which system is not complex, is easy to fabricate, operate and maintain, and is flexible to meet varied process requirements.

Therefore, one object of the present invention is to provide an improved apparatus useful for conducting extraction between materials of differing densities.

Another object of the present invention is to provide an improved method for extraction between materials of differing densities. Other objects and advantages of the present invention will become apparent hereinafter.

An improved apparatus useful for conducting extraction between a relatively heavy, solid or liquid first material and a relatively light, solid or liquid second material has been discovered. Extraction methods using such apparatus provide outstandingly advantageous results.

Before proceeding with the description of the present invention, the term "extraction" as used herein is to be considered in its broad context. That is, as used herein, the term "extraction" refers to any situation in which the relatively heavy material leaving the extraction zone includes more or less of at least one component than the relatively heavy material entering the extraction zone and, conversely, the relatively light material leaving the extraction zone includes less or more of such component (s) (or its precursor (s)) than the relatively light material entering the extraction zone. Such physical/chemical mass transfer operations as extraction, leaching, adsorption, absorption, desorption and the like are included within the scope of the term "extraction" as used herein.

One aspect of the present invention, particularly useful when at least one of the materials is liquid and counter-current extraction is envisioned, involves the following apparatus which comprises:

(a) An elongated vessel means including first and second ends, first and second end walls, first and second side walls and a bottom wall;

(b) A first outlet means located at or near the first end of the vessel means for removing relatively light material from the vessel means;

(c) A second outlet means located at or near the second end of the vessel means for removing relatively heavy material from the vessel means;

(d) A first parallel plate assembly means located in the vessel means near the first end of the vessel means and acting to produce the relatively light material to be removed via the first outlet means;

(e) At least one, and preferably a plurality of, intermediate parallel plate assembly means located in the vessel means substantially horizontally spaced away from the first parallel plate assembly means, and preferably from each other, and acting to provide a degree of material separation based on material density;

(f) A second parallel plate assembly means located in the vessel means substantially horizontally spaced away from the intermediate parallel plate assembly means, located near the second end of the vessel means and acting to produce the relatively heavy material to be removed via the second outlet means;

(g) First inlet means located relatively near the first end of the vessel means and acting to introduce the first (feed) liquid or solid, relatively heavy material into the vessel means;

(h) Second inlet means located relatively near the second end of the vessel means and acting to introduce the second (feed) liquid or solid, relatively light material into the vessel means; and (i) A plurality of agitation means at least one of the agitation means being located in each space between the parallel plate assembly means to facilitate contact between the materials present in such space.

In another aspect, the present invention involves an apparatus useful for co-current extraction of liquid-liquid materials or liquid-solid materials wherein the materials involved in the extraction have mutually different densities. In this instance, the present apparatus comprises:

(a) An elongated vessel means as described above;

(b) Inlet means located at or near the first end of the vessel to introduce a first relatively heavy material and a second relatively light material into the vessel means;

(c) At least one parallel plate assembly means located in the vessel means in substantially horizontally spaced relation along the length of the vessel means and acting to provide a plurality of substantially parallel paths for material flow;

(d) A plurality of agitation means located in the spaces before and after each of the parallel plate assembly means along the length of the vessel means and acting to facilitate contact between the materials present in each of these spaces;

(e) A parallel plate separation means located in the vessel means downstream from the parallel plate assembly means to separate a relatively heavy material and a relatively light materail;

(f) First outlet means for removing the relatively light material from the vessel means; and (g) Second outlet means for removing the relatively heavy material from the vessel means.

The present apparatus preferably further comprises substantially stationary base means acting to substantially eliminate material flow beneath and around the parallel plate assembly means.

The present apparatus offers many advantages. Firstly, the ease of fabrication. The vessel means is trough-like and easily fabricated from plates of metal, thermoplastic, concrete, fiberglass composite, or other materials commonly used to fabricate vessels. There are few openings below liquid level of fabricate, leak, or require service. Also, there are a minimum of moving parts because no pumping is required between agitated spaces (stages) (this is very important when handling abrasive solids) and the drive or drives preferably used to power the agitation means are accessible high and dry above liquid level with no liquid-tight shaft-seals required as there are with side-entry agitators on many extraction column designs. Agitation can easily be varied from space to space (stage to stage) to meet process requirements, and the extraction unit can be built with as many spaces (stages) as needed without height restrictions as it is substantially horizontal and easily supported on the ground.

Secondly, the operation of the unit is simple and flexible enough to meet varied process requirements. The extractor can easily be adapted to be either co or counter current, and will process either light or heavy solids phase dispersed in the liquid phase or be used for liquid/liquid extraction. Residence time of materials can be altered from space to space (stage to stage) to meet process requirements by, for example:

(1) Varying the horizontal distance between parallel plate assembly means to vary the agitated space between the assemblies;

(2) Adding to or subtracting grom the area of a flow path of the parallel plate assembly means accessible to material flow (e.g., use a flow blocker means as described herein).

The smaller this accessible area, the more material is randomly denied access to the next space (stage), thereby raising the concentration of that material in a given agitated volume, e.g., upstream from the flow blocker means;

(3) Varying the angle formed by a line connecting the tips of the plates in a given parallel plate assembly means and vertical to provide more of less (as desired) horizontal area of open flow passages between the plates available for descending material to enter and travel the flow passages to the next agitated space (stage) and/or (4) Entry baffles means to control the turbulence of the material entering one or more of the parallel paths of a given parallel plate assembly means. Although there are many combinations possible, in general many large entry baffles make very still areas so that very fine and slow settling materials will get the time free from agitator turbulence to descend into the flow paths between the parallel plates. No entry baffles or a few small entry baffles would suffice for heavy hard-to-suspend particles by blocking just enough turbulence to allow them to quickly fall into the flow channels.

The use of parallel flow channels between substantially horizontally spaced agitated spaces (stages) eliminates the need to separate and collect material for transfer to the next stage as is often done (see U.S. 4,268,484 and U.S. 4,292,277 and U.S.S.R. Patent Document 891,109), so that the materials continue to be in intimate contact even while transferring from stage to stage, offering better contact efficiency. In other words, the present agitation means and parallel plate assembly means act together so that the first and second materials continue to be in intimate contact even while transferring from space to space. Also, the sloped flow paths of the present extractor allows operation with dense solid phase while designs relying on overflow weirs to control flow between stages are thus limited to liquids-only operation.

BRIEF DESCRIPTION OF THE DRAWINGS

These and other aspects and advantages of the present invention are set forth in the following detailed description and claims, particularly when considered in conjunction with the accompanying drawings in which like parts bear like reference numerals. In the drawings:

FIG. 1 is a top plan view of one embodiment of the present apparatus.

FIG. 2 is a front view, partly in cross-section, of the embodiment shown in FIG. 1.

FIG. 3 is elevation view taken along line 3—3 in FIG. 2.

FIG. 4 is a plan view, partly in cross-section taken along line 4—4 in FIG. 2.

FIG. 5 is an elevation view taken along line 5—5 in FIG. 2.

DESCRIPTION OF THE PREFERRED EMBODIMENT

Figure 6:
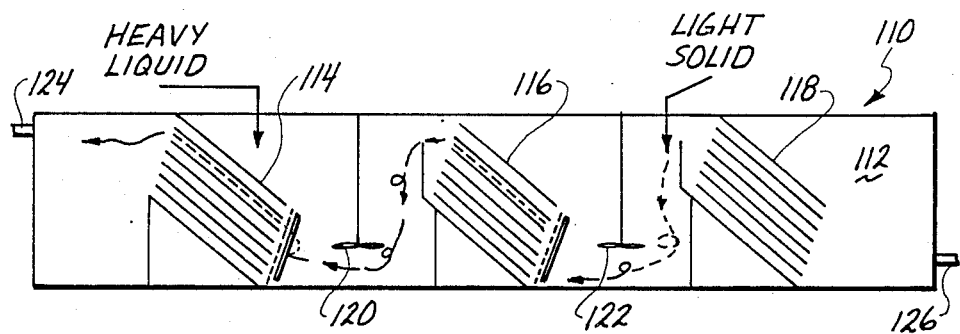
FIG. 6 is a schematic illustration of another embodiment of the present apparatus.

Referring now to FIGS. 1, 2, 3, 4 and 5, a countercurrent extractor shown generally as 10, includes a vessel 12, three parallel plate assemblies 14, 16 and 18, two stirrers 20 and 22, a first outlet 24, a second outlet 26 and an auxiliary second outlet 28.

Vessel 12 includes first end wall 30, second end wall 32, first side wall 34, second side wall 36, and bottom wall 38. The top of vessel 12 is open which allows the materials to be extracted in extractor 10 to be introduced into vessel 12 at any point along its length, as desired. More highly structured material inlets may be associated with extractor 10 to act to introduce the materials to be extracted into vessel 12. In any event, extractor 10 is equipped with means to allow such materials to be introduced into vessel 12 at mutually different points along the length of vessel 12.

Parallel plate assemblies 14, 16 and 18 each comprise a series of six (6) substantially parallel plates 40, 42 and 44, respectively. Each plate 40, 42 and 44 is fitted into vessel 12 between first side wall 34 and second side wall 36. Parallel plate assemblies 14, 16 and 18 are structured to form material flow paths between adjacent plates 40, 42 and 44, respectively. An additional material flow path is provided between the lowermost plate 40, 42 and 44 and stationary bases 46, 48 and 50, respectively. Stationary bases 46, 48 and 50 are comprised of continuous walls located on the bottom wall 38 of vessel 12, closing off vessel between first side wall 34 and second side wall 36 so that material flow beneath and around the plate assemblies 14, 16 and 18 is substantially eliminated.

Stirrers 20 and 22 are located in vessel 12 in the space between parallel plate assemblies 14 and 16 and parallel plate assemblies 16 and 18, respectively, and are also connected to drive shafts 52 and 54, respectively. Drive shafts 52 and 54 are associated with individual drives (not shown) which power stirrers 20 and 22.

Exit baffles 56 and 58 depend from the uppermost plate 40 and 42 and extend the entire width of vessel 12. Exit baffles 56 and 58 act to reduce the effect of turbulence caused by stirrers 20 and 22 on the material flowing through the flow paths of parallel plate assemblies 14 and 16, respectively.

Parallel plate assemblies 16 and 18 each include an entry baffle comprised of a series of three elongated elements 60 and 62 which extend outwardly from the ends of plates 42 and 44, respectively and are oriented perpendicular to plates 42 and 44, respectively. Elongated elements 60 and 62 act to reduce the turbulence (caused by stirrers 20 and 22, respectively) of the material entering the material flow paths of parallel plate assemblies 16 and 18, respectively. Flow blocker elements 64 and 66 are attached to the ends of parallel plate assemblies 16 and 18, respectively, and act to restrict the flow of material through a portion of all the material flow paths of assemblies 16 and 18, respectively.

The structure, number and presence of each of exit baffles 56 and 58, the entry baffles and flow blocker elements 64 and 66 can be varied and customized, as desired, to aid in providing optimum conditions for any given extraction application.

Extractor 10 functions as follows. Relatively light water is introduced into vessel 12, on a continuous basis, through the open top of vessel 12 at 68, which is relatively near second end wall 32. Relatively heavy (relative to water) powdered ore, containing one or more substances desired to be extracted into the water, is introduced into vessel 12, on a continuous basis through the open top of vessel 12 at 70, which is relatively near first end wall 30. It should be understood that other relatively light and heavy materials may be used depending on the extraction desired.

Stirrers 20 and 22 are activated and a continuous water-ore extraction takes place in extractor 10. The dashed line, shown in FIG. 2, illustrates one path that might be taken by the ore particles from point 70 to auxiliary second outlet 28. When the relatively heavy material is a solid, it is preferred to block second outlet 26 in second end wall 32 to flow and use auxiliary second outlet 28 in bottom wall 38 to remove the solid material from vessel 12. Conversely when the relatively heavy material is a liquid, it is preferred to use second outlet 26, which is equipped with a downward extending weir 72, to remove this heavy material from vessel 12 and auxiliary second outlet 28 is blocked to flow.

The relatively light water phase is removed from vessel 12 via first outlet 24 in first end wall 30 of vessel 12. First outlet 24 is equipped with an upwardly extending weir 74.

Additional stirrers, such as 20 or 22, and parallel plate assemblies, such as 16, may be horizontally spaced along the length of vessel 12 if additional extraction is desired. Parallel plate assemblies 14 and 18 not only act to provide additional intimate material contact to facilitate extraction, but also serve to separate the relatively heavy and light materials prior to removal from vessel 12.

Over a period of time, extractor 10, operated as described above, provides for effective and efficient extraction of the desired substance (s) from the relatively heavy ore into the relatively light water.

FIG. 6 illustrates an extractor 110 particularly useful when the relatively heavy feed material is liquid and the relatively light feed material is solid. Extractor 110 includes a vessel 112, three parallel plate assemblies 114, 116 and 118, two stirrers 120 and 122, a first outlet 124 and a second outlet 126.

In comparing FIG. 6 with FIG. 2, note that the baffling arrangement has been substantially reversed. This is done to facilitate extraction between a light solid and heavy liquid (illustrated in FIG. 6) compared to extraction between a heavy solid and a light liquid (shown in FIG. 2).

Although first outlet 124 is shown schematically as a conduit extending from vessel 112, it is understood that first outlet 124 may be any device or sub-system, e.g., a conventional skimming device, useful to remove floating solids.

Each of the components of extractor 110 perform substantially as the corresponding components in extractor 10, described previously. Over a period of time, continuous and effective extraction, as desired, takes place between the relatively light solid and the relatively heavy liquid feed to extractor 112.

Figure 7:
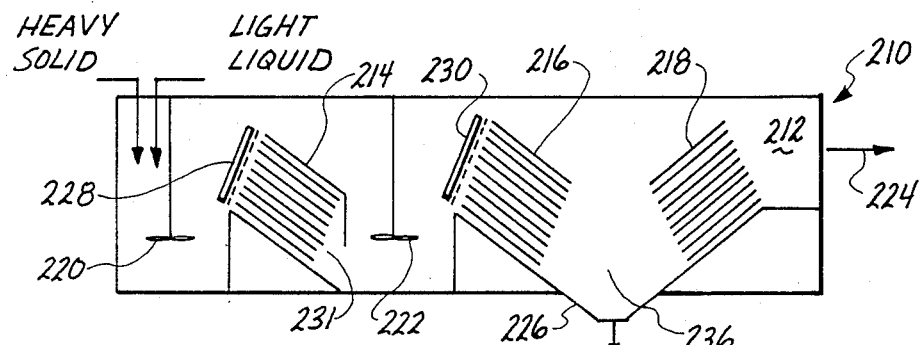
FIG. 7 is a schematic illustration of a further embodiment of the present apparatus.

FIG. 7 illustrates co-current extractor, shown generally as 210. This embodiment particularly useful for conducting extraction between a relatively heavy liquid or solid and a relatively light liquid, includes a vessel 212, three parallel plate assemblies 214, 216 and 218, stirrers 220 and 222, a first outlet 224 and a second outlet 226. Parallel plate assemblies 214 and 216 include second outlet 226. Parallel plate assemblies 214 and 216 include associated entry baffles 228 and 230, respectively, which are structured and function in a manner similar to entry baffles 60 and 62, described previously. Exit baffle 231 is associated with parallel plate assembly 214 and is structured and functions in a manner similar to exit baffles 56 and 58, described previously. Vessel 212 is open topped.

Extractor 210 functions as follows. A relatively heavy solid (or liquid) and a relatively light liquid are introduced into vessel 212 upstream of stirrer 220, as shown in FIG. 7. Stirrers 220 and 222 are activated and function in a manner consistent with the similarly structured stirrers previously described. The mixed material moves through the flow paths created by parallel plate assembly 214 and is again subjected to agitation by stirrer 222. The mixture then passes through the flow paths created by parallel plate assembly 216 into space 233. Parallel plate assemblies 216 and 218 are oriented to form a funnel or trap so that the relatively heavy solid material settles to the bottom of space 233 and is removed from vessel 212 via second outlet 226. Parallel plate assembly 218 acts to provide a final stage of separation between the relatively heavy and relatively light materials, so that the relatively light liquid material passes through the flow paths created by parallel plate assembly 218, and is removed from vessel 212 via first outlet 224.

Over a period of time, the desired extraction occurs in extractor 210.

Figure 8:
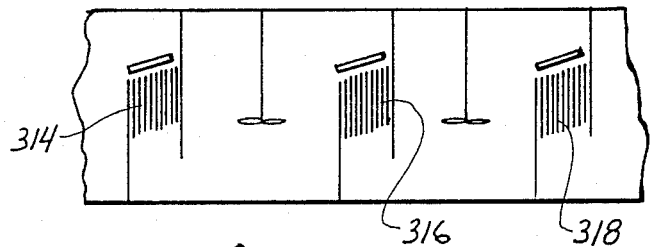
FIG. 8 is a partial schematic illustration of a still further embodiment of the present apparatus.

FIG. 8 illustrates an embodiment of the present invention which includes three parallel plate assemblies 314, 316 and 318 which are oriented to create substantially vertical flow paths. Such orientation is particularly suited for clay-like ores and other "sticky" solids which tend to settle on and/or stick to the parallel plates.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows.

1. An apparatus useful for conducting extraction between a relatively heavy solid or liquid first material and a relatively light solid or liquid second material, provided that at least one of said first and second materials is liquid, which comprises:
    (a) An elongated vessel means including first and second ends, first and second end walls, first and second side walls and a bottom wall;
    (b) A first outlet means located at or near said first end of said vessel means for removing relatively light material from said vessel means;
    (c) A second outlet means located at or near said second end of said vessel means for removing relatively heavy material from said vessel means;
    (d) A first parallel plate assembly means comprising a plurality of substantially parallel paths through which material can flow and located in said vessel means near said first end of said vessel means and acting to produce said relatively light material to be removed via said first outlet means;
    (e) At least one intermediate parallel plate assembly means comprising a plurality of substantially parallel paths through which material can flow and located in said vessel means, substantially horizontally spaced away from said first parallel plate assembly means and acting to provide a degree of material separation based on material density;
    (f) A second parallel plate assembly means comprising a plurality of substantially parallel paths through which material can flow and located in said vessel means, substantially horizontally spaced away from said intermediate parallel plate assembly means, located near said second end of said vessel means and acting to produce said relatively heavy material to be removed via said second outlet means;
    (g) First inlet means located relatively near said first end of said vessel means and acting to introduce said first material into said vessel means;
    (h) Second inlet means located relatively near said second end of said vessel means and acting to introduce said second material into said vessel means, provided that said first inlet means is located so as to introduce said first material into the space between said first parallel plate assembly and the nearest intermediate parallel plate assembly and said second inlet means is located so as to introduce said second material into the space between said second parallel plate assembly and the nearest intermediate parallel plate assembly;
    (i) A plurality of agitation means, at least one of said agitation means being located in each space between said parallel plate assembly means to facilitate contact between the materials present in said space, said agitation means and said parallel plate assembly means acting together so that said first and second materials continue to be in intimate contact even while transferring from space to space; and
    (j) Stationary bases along the bottom wall acting to substantially eliminate material flow beneath and around said parallel plate assembly means.

2. The apparatus of claim 1 wherein at least one of said first, second and intermediate parallel plate assembly means includes an exit baffle means acting to reduce the effect of turbulence caused by said agitation means on the material flowing through at least one of said substantially parallel paths.

3. The apparatus of claim 1 wherein at least one of said first, second and intermediate parallel plate assembly means includes entry baffle means which act to reduce the turbulence of the material entering at least one of said substantially parallel paths.

4. The apparatus of claim 3 wherein said entry baffle means comprises at least one elongated element located at or near one end of, and oriented substantially perpendicular to, said substantially parallel paths of said parallel plate assembly means.

5. The apparatus of claim 3 wherein each of said intermediate parallel plate assembly means includes an entry baffle means.

6. The apparatus of claim 3 wherein said entry baffle means further comprises flow blocker means acting to restrict material flow through a portion of all of said substantially parallel paths.

7. The apparatus of claim 1 wherein at least one of said first, second and intermediate parallel plate assembly means includes flow blocker means acting to restrict material flow through a portion of all of said substantially parallel paths.

8. The apparatus of claim 1 wherein said substantially parallel paths are oriented about 90° from the horizontal.

9. The apparatus of claim 1 wherein said second outlet means is located in said bottom wall.

10. An apparatus useful for conducting extraction between a relatively heavy solid or liquid first material and a relatively light solid or liquid second material; provided that at least one of said first and second materials is liquid, which comprises:
   (a) An elongated vessel means including first and second ends, first and second end walls, first and second side walls and a bottom wall;
   (b) Inlet means located at or near said first end of said vessel means for introducing said first and second materials into said vessel means;
   (c) At least one parallel plate assembly means located in said vessel means, in substantially horizontally spaced relation along the length of said vessel means and acting to provide a plurality of substantially parallel paths for material flow;
   (d) A plurality of agitation means, at least one of said agitation means being located in the spaces before and after each of said parallel plate assembly means along the length of said vessel means and acting to facilitate contact between the materials present in each said space, said agitation means and said parallel plate assembly means acting together so that said first and second materials continue to be in intimate contact even while transferring from space to space;
   (e) A parallel plate separation means located in said vessel means downstream from the last of said parallel plate assembly means and acting to separate a relatively heavy material and a relatively light material, said parallel plate separation means comprising two parallel plate assemblies substantially horizontally spaces apart so as to form a central space therebetween;
   (f) First outlet means located at or near said second end of said vessel means for removing said relatively light material from said vessel means;
   (g) Second outlet means located in association with said parallel plate separation means for removing said relatively heavy material said central space of said vessel means; and
   (h) Stationary bases along the bottom wall acting to substantially eliminate material flow beneath and around said parallel plate assembly means.

11. The apparatus of claim 10 wherein said parallel plate assemblies each provide a plurality of substantially parallel paths for material flow and include means to segregate said relatively heavy material in the bottom of said central space.

12. The apparatus of claim 10 wherein at least one of said parallel plate assembly means includes at least one of (1) an exit baffle means acting to reduce the effect of turbulence caused by said agitation means on the material flowing through at least one of said substantially parallel paths; (2) an entry baffle means comprising at least one elongated element located at or near one end of, and oriented substantially perpendicular to, said substantially parallel paths of said parallel plate assembly means and acting to reduce the turbulence of the material entering at least one of said substantially parallel paths; and (3) flow blocker means acting to restrict material flow through a portion of all of said substantially parallel paths.

13. The apparatus of claim 12 wherein said substantially parallel paths are oriented about 90° from the horizontal.

14. A method of conducting extraction between a relatively light first material and a relatively heavy second material, provided that at least one of said first and second materials is liquid, comprising:
   passing said first material into an elongated vessel through a first inlet located at or near the first end of said vessel;
   passing said second material into said vessel through a second inlet located at or near the second end of said vessel;
   causing at least a portion of said first and second materials to contact each other while flowing through a first, at least one intermediate, and a second parallel plate assembly located in said vessel, each said parallel plate assembly comprising a plurality of parallel paths available for material flow, provided that material flow beneath and around said intermediate assembly is substantially eliminated and said first and second materials are substantially continuously contacted;
   agitating said first and second materials in each space between said assemblies to facilitate contact between said first and second material in said space; and
   recovering a relatively light product at or near said first end of said vessel, and a relatively heavy product at or near said second end of said vessel.

15. The method of claim 14 wherein both of said first and second materials are liquid.

16. The method of claim 14 wherein said first material is a solid.

17. The method of claim 14 wherein said second material is a solid.

* * * * *